United States Patent
Nyiri et al.

(10) Patent No.: US 11,912,395 B2
(45) Date of Patent: Feb. 27, 2024

(54) PROPELLER AND PROPELLER BLADE

(71) Applicants: Attila Nyiri, Esztergom (HU); Robert Cirus, Esztergom (HU); Norbert Cirus, Esztergom (HU)

(72) Inventors: Attila Nyiri, Esztergom (HU); Robert Cirus, Esztergom (HU); Norbert Cirus, Esztergom (HU)

( * ) Notice: Subject to any disclaimer, the term of this patent is extended or adjusted under 35 U.S.C. 154(b) by 0 days.

(21) Appl. No.: 17/111,405

(22) Filed: Dec. 3, 2020

(65) Prior Publication Data
US 2021/0214071 A1    Jul. 15, 2021

Related U.S. Application Data

(63) Continuation-in-part of application No. 16/062,698, filed on Jun. 15, 2018, now abandoned, which is a continuation-in-part of application No. PCT/HU2017/000026, filed on Apr. 4, 2017.

(51) Int. Cl.
*B64C 11/18* (2006.01)
*B64C 21/02* (2006.01)

(52) U.S. Cl.
CPC ............. *B64C 11/18* (2013.01); *B64C 21/02* (2013.01); *B64C 2230/20* (2013.01)

(58) Field of Classification Search
CPC ..... B64C 11/18; B64C 11/20; B64C 2230/20; B64C 2230/22; B64C 21/02; B64C 21/025; F03D 1/0633; F03D 1/0608; F03D 1/0675; F03D 1/0683; F04D 29/324; F04D 29/325
See application file for complete search history.

(56) References Cited

U.S. PATENT DOCUMENTS

| | | | | |
|---|---|---|---|---|
| 4,714,408 A | * | 12/1987 | Abe | F04D 29/38 416/91 |
| 6,435,815 B2 | * | 8/2002 | Harvey | F04D 29/682 415/115 |
| 7,832,689 B2 | * | 11/2010 | Prince | F03D 1/0641 244/200.1 |
| 8,016,567 B2 | * | 9/2011 | Praisner | F04D 29/684 416/231 A |
| 8,246,311 B2 | * | 8/2012 | Pesetsky | F03D 1/06 416/90 R |

(Continued)

FOREIGN PATENT DOCUMENTS

| JP | H01203698 A | * | 8/1989 |
|---|---|---|---|
| JP | 2005240749 A | * | 9/2005 |
| JP | 6222804 B2 | * | 11/2017 |

*Primary Examiner* — Justin D Seabe
(74) *Attorney, Agent, or Firm* — McNeely Hare & War LLP; Sarika Singh

(57) ABSTRACT

The subject of the invention is a propeller blade that has minimal blade tip loss, has a pressure side, opposite to that a suction side, a blade root that can be attached to the propeller and opposite to the blade root a blade tip, where the pressure side is attached to the suction side with a slot that has an inlet opening on the pressure side and an outlet opening on the suction side, and the slot has a pressure equalizing element in it.

Furthermore, the subject of the invention is a propeller that can be used for airplanes, helicopters, horizontal-axis wind turbines, fans and drones and that has at least one propeller blade which is designed according to the first aspect of the invention.

20 Claims, 5 Drawing Sheets

(56) References Cited

U.S. PATENT DOCUMENTS

2005/0147497 A1* 7/2005 Doerffer ............... F04D 29/324
                                                                416/231 R
2005/0207895 A1* 9/2005 Dunn ..................... B64C 27/46
                                                                416/223 R
2015/0050146 A1* 2/2015 Dorweiler ............... F03B 3/121
                                                                416/223 R

* cited by examiner

Section A-A

PROPELLER AND PROPELLER BLADE

CROSS-REFERENCE TO RELATED APPLICATIONS

This application is a continuation in part of U.S. patent application Ser. No. 16/062,698, filed Jun. 15, 2018, which in turn is continuation in part of International Application No. PCT/HU2017/000026 filed Apr. 4, 2017, which claims the benefit of Hungarian Patent Application No. P1600523, filed Jun. 7, 2016, each of which is incorporated by reference herein in its entirety.

FIELD OF THE INVENTION

The subject of the invention is a propeller and a wide propeller blade that can be used on airplanes, helicopters, horizontal-axis wind turbines, fans, and drones.

BACKGROUND OF THE INVENTION

The requirements for propellers and propeller blades comprising them are complex. One should try to achieve the ideal flow conditions as much as possible so that the power input or output equals the power of the connected engine or generator. To reach this, technical compromises must always be made. When propellers, horizontal-axis wind turbines or fans shall only be manufactured with a limited diameter, the ideal performance can be reached by making their blades wider. In this case, however, the flow conditions deteriorate, and significant, unwanted vortices are generated at the wide tip of the blades. These vortices clearly cause energy losses and the deterioration of efficiency. An alternative or additional solution would be to increase the number of blades, but if more than four blades are arranged in one plane, the blades interfere with each in respect of fluid mechanics.

To reduce the loss in the case of airplane wings, a so-called winglet (or wing flap, wingtip device) is used. This is a vertically positioned flap or an upward extension of the wing, located at the wing tip of some airplanes. The winglet reduces the vortices created at the tip of the wing. These vortices would otherwise significantly increase the air resistance of the wing. However, the winglet is only effective in case of linear motion and is therefore only used on wings.

Propeller blades used on airplanes, helicopters, or drones, as well as horizontal-axis wind turbine blades or fan blades also generate vortices at their tips farther away from the axis of rotation. The generated vortices increase energy loss. Losses are particularly significant when the tip of the blade is wide and not pointed.

An edge vortex scatter plate, similar to a winglet, situated at the wing tip or blade tip is presented in document DE3816430. The plate is situated at right angles to the longitudinal direction of the blade and has slot-like holes to reduce the vortices at the blade tip. The holes widen towards the edge of the plate, thus ensuring that the differential pressure between the pressure and suction side does not suddenly start to equalize in order to maintain the lift.

The solution described in patent EP 0782956 A1 attempts to reduce the vortices generated at the tip of the rotor blades of helicopters by the complex geometrical design of the rotor tip.

U.S. Pat. No. 2,160,323 presents a propeller having a slot in the blade to relieve vacuum on the suction side of the blade, to reduce the accompanying noise and to increase efficiency. The slot connecting the pressure side of the blade to the suction side is oblong, its length is 70-80% of the length of the blade, and is situated almost completely along the longitudinal axis of the blade. However, this patent does not specifically teach about reducing flow losses generated at the blade tip.

U.S. Pat. No. 6,283,406 B1 discloses a solution that reduces noise generated by helicopter rotors. The blade tips have air intake openings close to the leading edge and air output openings close to the trailing edge, as well as passages connecting them near the surface of both the suction and the pressure side. Thus, the passages do not connect the suction and pressure sides, but basically run parallel to the sides of the blade and form slots through which air cannot constantly move, but are controlled to open and close above a certain level of noise, pressure and speed. According to another aspect of this solution, jets are situated at the blade tip at different locations and orientations, through which flow is ejected to accelerate the attenuation of the vortices at the blade tips.

U.S. Pat. No. 5,791,875 also discloses a relatively complex control device for reducing blade tip vortices. Here, a vortex rotating in the opposite direction is created, and the fluid for this purpose gets to the wing tips through slots disposed at the wing and at the rotor blade, where the fluid is directed with controlled pressure and in a controlled, curved path to form a counter-vortex.

The solution described in publication document EP3509945 A1 (International Application No. PCT/HU2017/000026 filed Apr. 4, 2017, which is a parent application and incorporated herein by reference) provides slots connecting the pressure and suction side of the blade are formed at the blade tip, specifically in order to eliminate the blade tip losses. In the publication, the distance of the slot from the blade tip is given as a percentage of the diameter's length in respect of the size and location of the vortices formed at the blade tip, in order to eliminate them by vortex interference. The slot is divided into sections with small interruptions.

The disadvantage of the state of the art wings and propellers is that they do not provide a solution to ensure the maximum strength of the blade or the blade tip with the design of the blade tip (or wing tip) vortex eliminating or -reducing device. Each of the referenced inventions has been created by relieving or omitting material, such as by creating longitudinal slots, holes, passages formed inside the blade, sometimes by placing complex control elements which create an additional load; however, there is no mention of strength aspects. Furthermore, they do not teach about the elimination of losses that are specifically due to pressure unevenness.

SUMMARY OF THE INVENTION

The objective of the present invention is to reduce or eliminate flow losses at the blade tip by the design of a propeller blade or propeller that provides uniform flow conditions across the entire width of the blade tip.

Another objective is to have the structure of the propeller blade or propeller—designed to reduce or eliminate flow losses at the blade tip—cause minimal air resistance and be of adequate strength to withstand centrifugal force.

In addition, it is an important criterion of the invention to provide a solution that is simple and requires no or minimal maintenance.

According to the first aspect of the invention, our objective is achieved by the design of a propeller blade that can be used as part of a propeller—having a given direction of rotation around the axis of rotation—for airplanes, helicopters, horizontal-axis wind turbines, fans and drones. The said propeller blade has a pressure side, opposite to that a suction side, a blade root that can be attached to the propeller and opposite to the blade root a blade tip, where the pressure side is connected to the suction side with a slot that has an inlet opening on the pressure side and an outlet opening on the suction side, and said slot has a pressure equalizing element in it.

According to another aspect of the invention, our objective is achieved by the design of a propeller for airplanes, helicopters, horizontal-axis wind turbines, fans and drones that is designed to rotate at a given direction of rotation around the axis of rotation. The propeller has at least one propeller blade which is attached to the hub that is in drive connection with the axis of rotation, and this one propeller blade is a propeller blade designed according to the first aspect of the invention.

The invention will now be described in more detail with reference to the accompanying figures.

DETAILED DESCRIPTION

The first aspect of this invention applies to propeller blades. The general characteristics of the propeller blade 10 designed for the flow of gaseous media in the case of airplanes, helicopters, fans or drones and for the generation of energy in the case of horizontal-axis wind turbines are presented using FIGS. 1 and 2.

Figure 1:
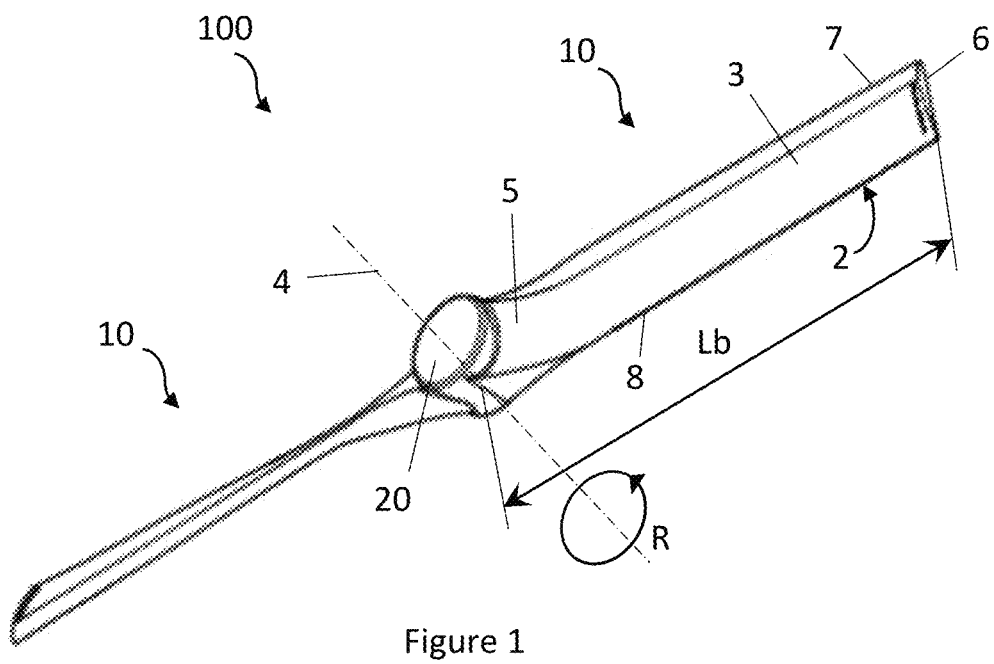
FIG. 1 is the perspective view of a propeller that has two propeller blades according to the invention, viewed from the suction side.

FIG. 1 shows a perspective view of a propeller 100 with two propeller blades 10 according to the invention viewed from the suction side of the propeller blades 10. The propeller blade 10 can be used as part of a propeller 100 rotating in a given direction of rotation R around an axis of rotation 4. Said propeller blade 10 has a pressure side 2, opposite to that a suction side 3, a blade root 5 that can be attached to the propeller 100 and opposite to the blade root 5—i.e. at its radially outer side compared to the axis of rotation—a blade tip 6 that is thus located along the circumference of the orbit traversed by the propeller 100 during operation. The propeller 100 shown in the figure also comprises a propeller hub 20 that is in drive connection with the axis of rotation 4. The two propeller blades 10 arranged opposite each other are attached to the propeller hub 20 at their blade roots 5.

There are airplane propellers in which the propeller blade 10 is generally made of one piece, so that its length is substantially equal to the diameter of the circle traveled by the propeller. However, in the case of wind turbines or fans, it is more common practice to mount separate propeller blades 10 on the propeller hub 20 or fan hub. The length of these blades is thus approximately the size of the radius of said circle reduced by the radius of the hub.

In this application, the blade length Lb uniformly means the distance between the blade root 5 and the blade tip 6.

The propeller blade 10 has a leading edge 7 extending along the blade length Lb and a trailing edge 8 opposite to the leading edge 7. When the propeller blade 10 is mounted on the propeller 100, the first blade edge in the direction of rotation indicated by the arrow R in FIG. 1 is the leading edge 7, and the subsequent blade edge is the trailing edge 8 during rotation; the blade width between them is generally referred to as chord length.

Figure 6:
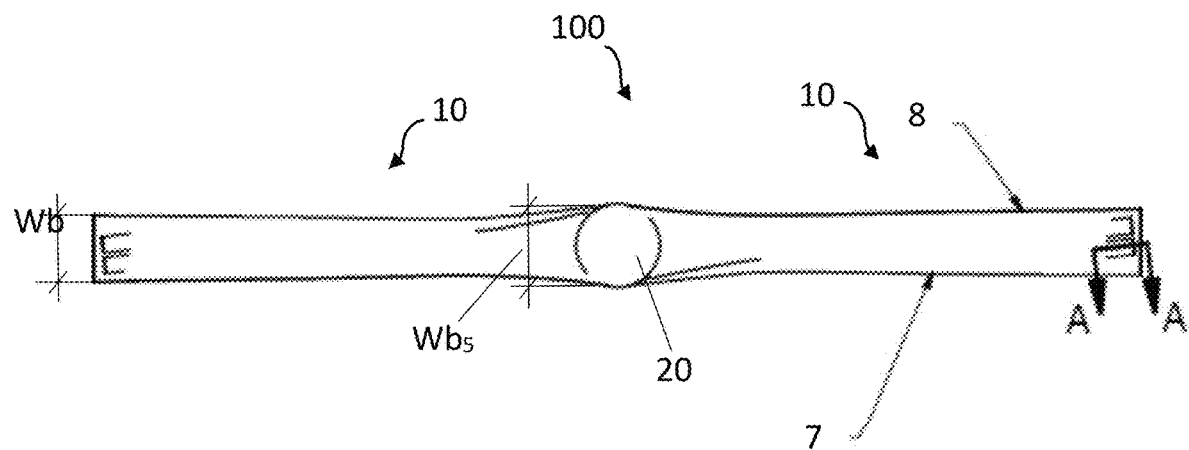
FIG. 6 is the bottom view of a propeller that has two propeller blades.

The so-called "pointed" blades and "wide" blades are distinguished among propeller blades. Propeller blades whose end or tip end at one point, namely at the intersection of the trailing edge 8 and the leading edge 7 of the propeller blade, are the pointed blades. In practice, the pointy tips are rounded by a certain radius, for technical and strength reasons. If the tip of the blade is not clearly pointed, then the intersection of the blade's longitudinal axis and the chord length at the tip of the blade, i.e. the width of the blade tip Wb is considered the tip. The so-called "wide" blade tips do not end at a tip (one point), but the blade tips 6 have a measurable width Wb (chord length). The present invention preferably applies to such wide blade tips. The blade tip width Wb of the propeller blade 10 measured at the blade tip 6 is preferably at least one third of the blade width $Wb_s$ measured at the blade root 5 (FIG. 6).

When adapting high performance, it is an issue to choose the propeller blade's 10 chord length, and wide blade tips 6 have to be formed in this case. This may be due to the fact that the diameter of the propeller cannot be increased because it would hit the ground, so it is necessary to increase the width Wb of the blade tip 6. However, in this case, losses due to blade tip vortices increase drastically. When using wide blade tips 6, the invention uses the phenomenon of vortex interference to reduce or eliminate the loss of potential due to blade tip vortices. This invention uses a passive approach—i.e. there is no need for intervention or complicated control during operation—by forming an effective slot 9 near the blade tip 6.

Figure 2:
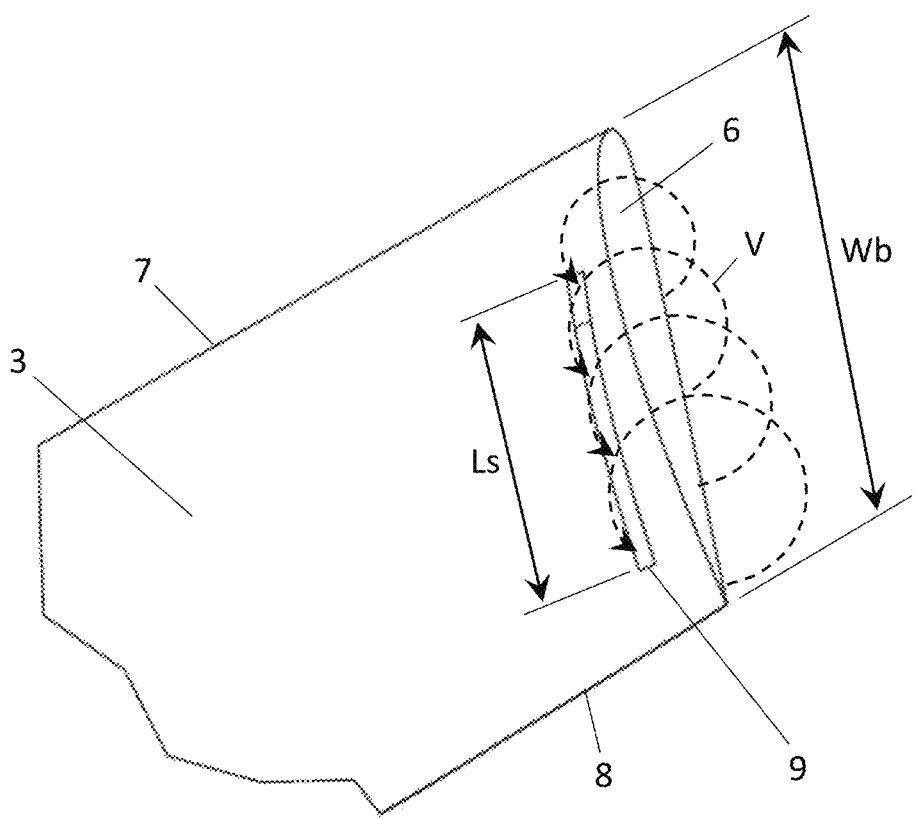
FIG. 2 is the tip of the propeller blades seen in FIG. 1 having a continuous slot at the tip, and the deteriorative vortex is also marked.

The mathematical modeling of the cone-forming deteriorative vortices V at the blade tips 6 illustrated in FIG. 2 is a rather complex task, difficult calculations and a number of approximations and simplifications would have to be applied. (Goldstein, Sydney. (1929). On the Vortex Theory of Screw Propeller.) It is simpler to calculate the loss and the deterioration of efficiency caused by the V vortices at the blade tips 6. Accordingly, the geometry and location of the slot 9 were determined on the basis of empirical measurement data, with iteration steps.

Figure 7:
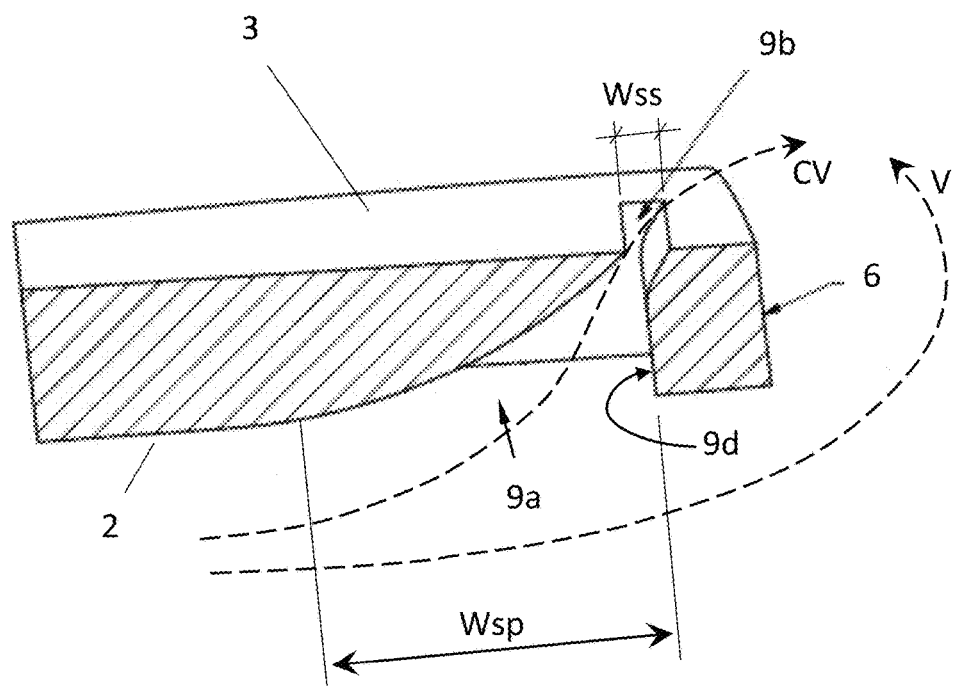
FIG. 7 is the cross-sectional view of the tip of the propeller blade along section line A-A of FIG. 6, with the marking of deteriorative vortices and vortices eliminating those.
Figure 8:
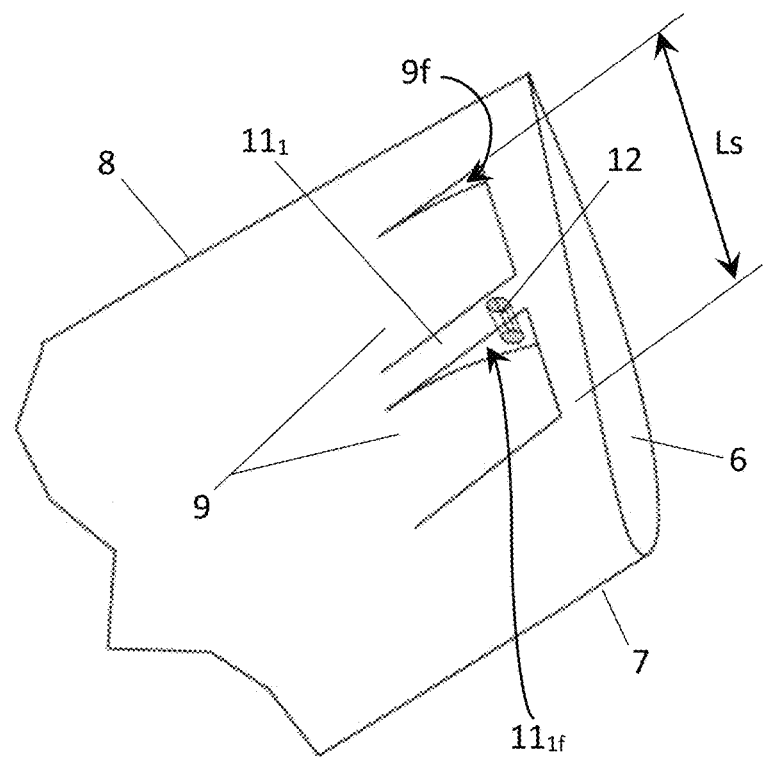
FIG. 8 is a favorable embodiment of the tip of the propeller blade according to the invention viewed from the pressure side, with the slot being divided into two sections and the pressure equalizing channel formed between them, uncovered.
Figure 9:
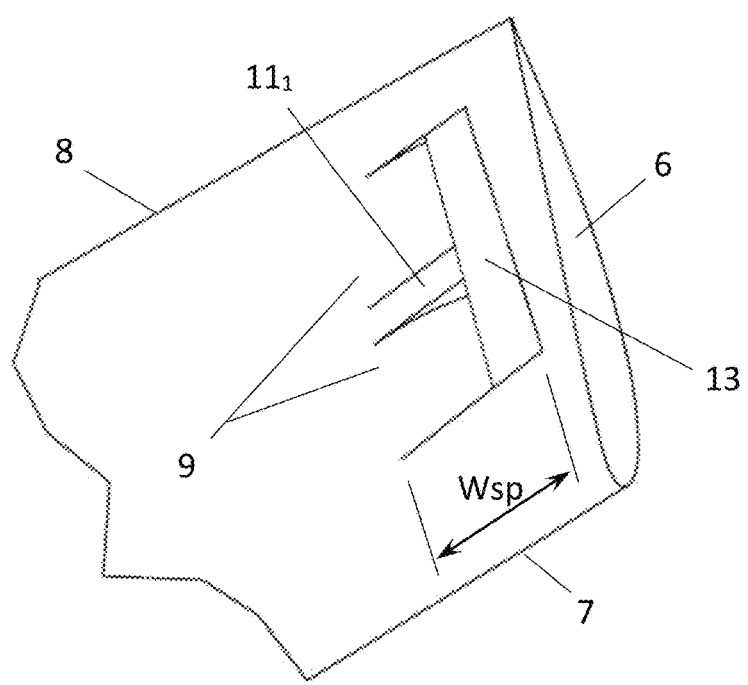
FIG. 9 is a favorable embodiment of the tip of the propeller blade according to the invention viewed from the pressure side, with the slot being divided into two sections, covered by a sheet.

FIG. 7's cross-sectional view shows the air passing from the pressure side 2 to the suction side 3 at the blade tip 6 is divided into two due to the slot 9, and the air passing through the slot 9 generates vortices CV of substantially the same size but having an opposite direction of angular momentum than the other vortices. The counter-vortices reduce or eliminate the deteriorative vortices V generated at the blade tips 6. In FIGS. 2 and 7, the deteriorative vortices are indicated by V, and the counter-vortices—generated by the present invention—reducing or eliminating them are indicated by CV.

Figure 3:
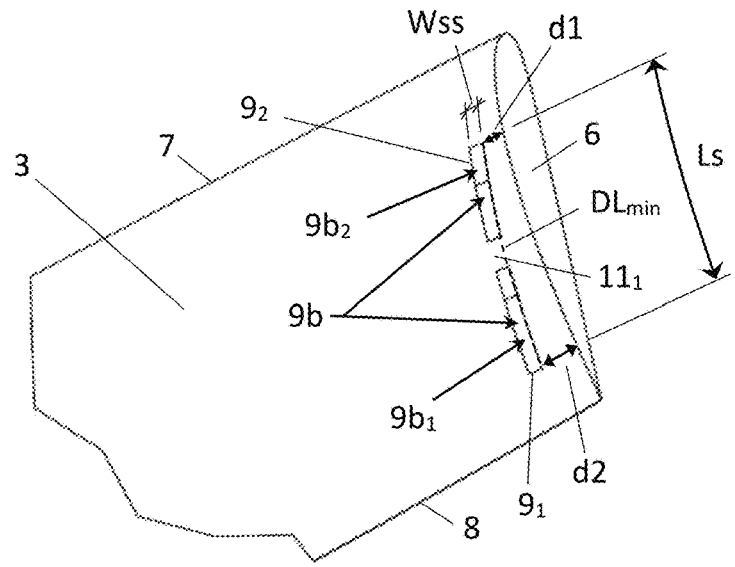
FIG. 3 is the tip of the propeller blade according to the invention having a slot at the tip with two sections, viewed from the suction side.
Figure 4:
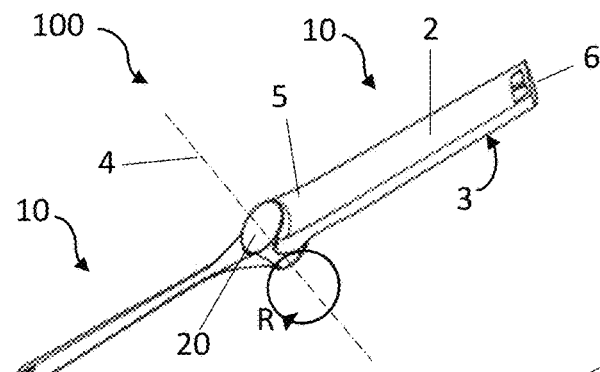
FIG. 4 is the perspective view of a propeller that has two propeller blades, viewed from the pressure side.
Figure 5:
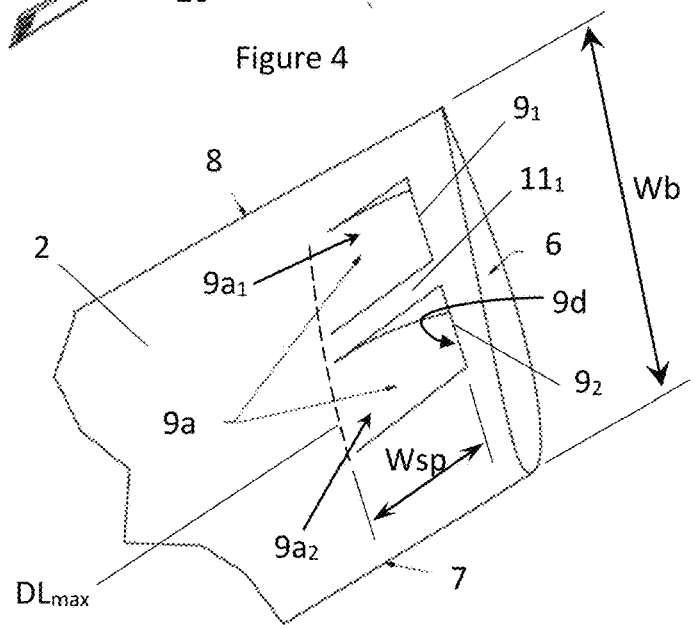
FIG. 5 is the tip of the propeller blades seen in FIG. 4 having a slot at the tip with two sections.

In order to achieve the best possible efficiency, it is important to determine the exact dimensions, geometry and position of the slot 9. In FIGS. 7 and 10a-10c it can be clearly seen that the slot 9 at the blade tip 6 functions as a nozzle. The slot 9 in the propeller blade 10 is formed in a way so that it connects the pressure side 2 with the suction side 3. The slot 9 has a length Ls and an inlet opening 9a with a predetermined width Wsp formed on the pressure side 2 (FIGS. 5 and 7). One side of the opening is the edge $DL_{max}$ of the slot 9 farthest from the blade tip 6 (FIGS. 5 and 10a-10c). The slot 9 also has an outlet opening 9b with a predetermined width Wss formed on the suction side 3 (FIGS. 3 and 7). The slot 9 is formed in the vicinity of the blade tip 6, i.e. the distance between the edge $DL_{max}$ of the slot 9 farthest from the blade tip 6 and the blade tip 6 is at most one-eighth of the length Lb of the propeller blade 10, but this distance is preferably between the one tenth and one twentieth of the length Lb of the propeller blade 10.

The inlet opening 9a of the slot 9 has a larger surface area than the outlet opening 9b. During operation, overpressure is generated on the lower half of the propeller blade 10, i.e. on the pressure side 2. A portion of the fluid here enters the slot 9 through the inlet opening 9a and then exits through the outlet opening 9b. The edge $DL_{min}$ of the slot 9 closest to the blade tip 6 is located on the outlet opening 9b, forming one side thereof (FIG. 3).

Figure 10A:
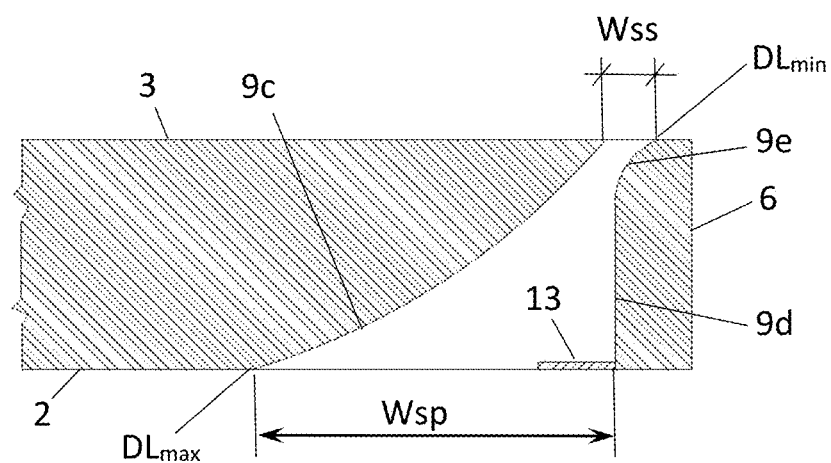
FIG. 10a is the cross-sectional view of a curved embodiment of the blade tip slot according to the invention wherein the inlet opening is covered by a sheet at parts of its width.
Figure 10B:
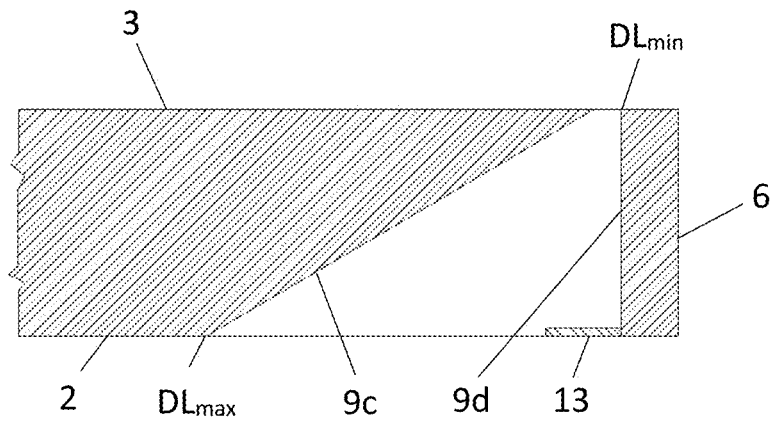
FIG. 10b is the cross-sectional view of an embodiment of the blade tip slot according to the invention with straight sides wherein the inlet opening is covered by a sheet at parts of its width.

The side 9c of the slot 9 farthest from the blade tip 6 is preferably curved from the pressure side 2 to the suction side 3, i.e. curved over its entire length, so that the slot 9 has an ever-narrowing design from the inlet opening 9a to the outlet opening 9b. This, on the one hand, facilitates the entry of the medium into the slot 9 and, on the other hand, further increases its pressure and speed. The side 9d of the slot 9 closer to the blade tip 6, opposite to the curved slot side 9c, is substantially perpendicular to the pressure side 2 almost in its entire length starting from the inlet opening 9a. However, there is a curved slot side 9e—whose radius and arc length is less than the curved side's 9c—positioned on the side 9d near the outlet opening 9b. The curved slot side 9e directs the fluid flowing out of the outlet opening 9b against the deteriorative vortex V generated at the blade tip 6. FIG. 10a shows that the intersection of the slot side 9e and the suction side 3 gives the slot edge $DL_{min}$ closest to the blade tip 6.

Figure 10C:
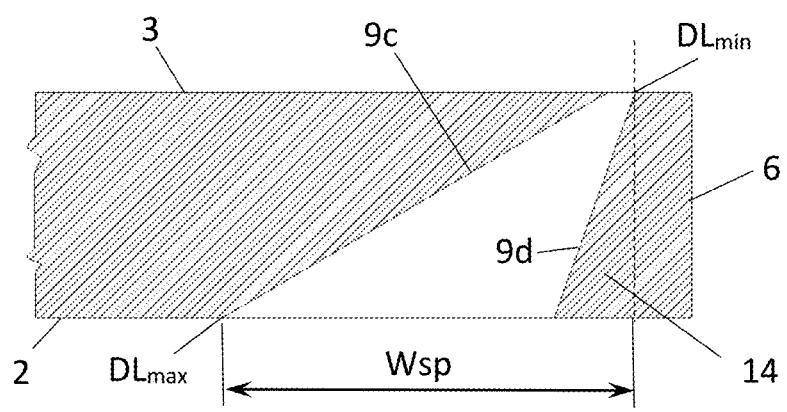
FIG. 10c is the cross-sectional view of an embodiment of the blade tip slot according to the invention with straight sides wherein the inlet opening is covered at parts of its width by the filled part of the slot's inside closer to the blade tip.

Instead of the slot design showed in FIGS. 7 and 10a, the cross-section of the slot 9 can be formed with straight sides (FIG. 10b), according to so which the gap side 9c is not curved, but has a straight design connecting the inlet opening 9a diagonally to the outlet opening 9b that has a smaller surface area. Furthermore, the side 9d is entirely straight from the pressure side 2 to the suction side 3, so it does not have a curved slot side 9e near the outlet opening 9b. The design of the side 9d can be substantially perpendicular to or at an angle to the pressure side 2 (FIG. 10c). With the latter design, i.e. the angular arrangement of the slot side 9d, substantially a part 14 of the slot's 9 inside is filled, thus providing a (solid) covering for the inlet opening 9a.

The slot 9 is arranged substantially parallel to the lateral surface of the resulting deteriorative vortex V, so that the intersection of the lateral surface (or surface) of the vortex V and the surface of the propeller blade 10 provides the location of the slot 9 to be formed. The deteriorative vortex V has a truncated cone shape along the width Wb of the blade tip 6 (FIG. 2), accordingly the slot 9—i.e. the slot edge $DL_{min}$—is arranged slightly obliquely in relation to the blade tip 6 along the width Wb of the blade tip 6. Thus, the distance of the slot 9 from the blade tip 6 is expressed by the distances measured from two points of the slot 9, namely from its starting point towards the leading edge 7 and from its endpoint towards the trailing edge 8 (FIG. 3).

FIG. 2 shows a slot design where the slot 9 is continuous. However, for strength reasons, the slot 9 is preferably divided into two or more slot sections $9_1 \ldots 9_n$ along its length Ls by one or more partition $11_1 \ldots 11_{n-1}$. FIGS. 3-6 and 8-9 show slots 9 which are divided into two slot sections $9_1, 9_2$ by one partition $11_1$. In the case of very wide (long chord length) blades 10, the slot 9 must be divided into n=3 or even more sections so that the blade tip 6 piece cannot be torn off by the centrifugal force or the aerodynamic forces present at the flight altitude.

FIG. 3 shows the first distance d1 between the slot edge $DL_{min}$ and the blade tip 6 at the slot's side closest to the leading edge 7 viewed from the suction side 3, and the second distance d2 between the slot edge $DL_{min}$ and the blade tip 6 at the slot's side 9f closest to the trailing edge 8 viewed from the suction side 3. The distances d1 and d2 were determined by methods of experimental physics, according to which the first distance d1 between the slot 9 and the blade tip 6 is 9%-18.5% of the width Wb of the blade tip 6, preferably 13.8% thereof; and the second distance d2 between the slot 9 and the blade tip 6 is 14%-23.5% of the width Wb of the blade tip 6, preferably 18.8% thereof. The geometry, dimensions and location of the slot 9 described here ensure the generation of a counter-vortex CV that has the opposite direction of rotation than the deteriorative vortex V, and can reduce or eliminate it.

Experience has shown that the generated counter-vortices CV follow the changes in the slot distances d1 and d2 more sensitively when they are a function of the width Wb of the blade tip 6 instead of being a function of the propeller's diameter. Therefore, providing the change of the slot distances relative to the blade tip 6 gives a significantly more accurate result than the solution presented in EP3509945 A1 in which the corresponding distance values between the slot 9 and the blade tip 6 are given as a percentage of the length of the propeller's diameter.

The slot's length Ls, its width Wsp on the pressure side 2 and its width Wss on the suction side 3 are characterized as follows (FIGS. 3 and 5).

The slot 9—divided into slot sections $9_1 \ldots 9_n$—has n-number of outlet openings $9b_1 \ldots 9b_n$ on the suction side 3. The outlet openings $9b_1 \ldots 9b_n$ are each rectangular, and the bounding rectangle of them is considered (for the sake of simplicity) to be the outlet opening 9b. The longer side of the rectangle bounding the outlet opening 9b gives the length Ls of the slot 9. The shorter side of the bounding rectangle of the outlet openings $9b_1 \ldots 9b_n$—i.e. the width Wss of the slot 9 on the suction side 3—is a fraction of the length Ls of the slot 9, approximately 2%-10% thereof, preferably 3.53% of it.

The slot 9—divided into slot sections $9_1 \ldots 9_n$—has n-number of inlet openings $9a_1 \ldots 9a_n$ on the pressure side 2. The inlet openings $9a_1 \ldots 9a_n$ are each rectangular, and the bounding rectangle of them is considered (for the sake of simplicity) to be the inlet opening 9a. The inlet opening's 9a length equals to the outlet opening's 9b length, which gives the length Ls of the slot 9. The shorter side of the bounding rectangle of the inlet openings $9a_1 \ldots 9a_n$—i.e. the shorter side of the rectangle bounding the inlet opening 9a—that is the width Wsp of the slot 9 on the pressure side 2 is shorter than the length Ls of the slot 9, approximately 20%-80% thereof, preferably 50% of it.

The length Ls of the slot 9, i.e. the longer dimension of the side 9d, is approximately 50%-90%—preferably 60%—of the width Wb of the blade tip 6, where in one type of embodiment the slot 9 is located along the width Wb of the blade tip 6 centrally, i.e. at the same distance from the leading edge 7 and the trailing edge 8. According to another type of embodiment, the distance between the slot 9—i.e. its side 9f (FIG. 8)—and the trailing edge 8 is approximately 0.1%-5% of the width Wb of the blade tip 6.

The dimension of the curved side 9c—parallel to the leading edge 7 and to the trailing edge 8—ranges from 30% to 98% of the length Ls of the slot 9. The dimension of the curved side 9e—parallel to the leading edge 7 and to the trailing edge 8—ranges from 0.1% to 2% of the length Ls of the slot 9.

The development realized by the present invention is based on the equalization of the differential pressures at the blade tip 6 and in the vicinity of the slot 9, and on its flow-improving effect. Accordingly, the slot 9 comprises pressure equalizing elements 12, 13, 14.

According to one of the preferred embodiments, the pressure equalizing element is the element 13, 14 which partially covers the inlet opening 9a of the slot 9. In order to increase the efficiency, those parts of the slot 9 which can generate measurable air resistance during the operation of the propeller blade 10, and thus create further turbulence and pressure unevenness within the slot, are at least partially covered as shown in FIGS. 9 and 10a-10c. These parts generating the air resistance and pressure unevenness are the side 9f of the slot 9 closest to the trailing edge 8, perpendicular to the angular velocity vector (indicated in FIG. 8) and—in the case of a divided slot 9—the surfaces $11_{1f} \ldots 11_{(n-1)f}$ on the side of the inlet opening 9a of the partitions $11_1 \ldots 11_{n-1}$, perpendicular to the angular velocity vector (in FIG. 8, only one partition $11_1$ is illustrated, so accordingly, only one such surface $11_{1f}$ is shown).

Thus, in order to achieve a reduction in air resistance and to equalize pressure, the inlet opening 9a of the slot 9 on its side closer to the blade tip 6 is covered by covering elements 13, 14 on part of the width Wsp, along the entire length Ls of the slot 9.

Preferably, the inlet opening 9a of the slot 9 is covered with a sheet 13 on approximately 10%-50% of its width Wsp, on its side closer to the blade tip 6, along the entire length Ls of the slot 9. The covering sheet 13 can be fixed by gluing, welding, releasable bonding, e.g. screwing. The sheet 13 is made of wood, metal, plastic or composite material.

As an alternative solution shown in FIG. 10c, the inlet opening 9a of the slot 9 is covered on approximately 10%-50% of its width Wsp by filling in the part 14 of the slot's 9 inside closer to the blade tip 6. The covering is realized along the entire length Ls of the slot 9. The simplest way to fill in the part 14 of the slot's 9 inside is using the propeller blade's 10 own material.

Covering the slot 9 with the aforementioned elements 13, 14 also restores the original outline (profile) of the blade's cross-section in the covered part while taking into account aerodynamic aspects, meaning that the vortex reducing ability of the slot 9 is maintained.

In the case of slots 9 which, for strength reasons, are divided by partitions $11_1 \ldots 11_{n-1}$ along their length, the covering has an additional operation-improving effect. In each of the slot sections $9_1 \ldots 9_n$, as in separate chambers, differential pressures are generated due to turbulence if they are uncovered. However, as a result of the covering, these differential pressures are reduced.

According to another preferred embodiment, the pressure equalizing element is designed as a pressure equalizing channel 12 positioned in the partitions $11_1 \ldots 11_{n-1}$. This channel reduces the losses due to differential pressures in the divided slot 9. In the case of a divided slot 9, another reason for the presence of differential pressures in each slot section $9_1 \ldots 9_n$ is that the pressure on the lower half of the propeller blade 10, i.e. on the pressure side 2, is not a constant value, it changes along the width of the blade. The lower airflow of the propeller blade 10, which has a higher air pressure during operation, is halved on the pressure side 2 of the propeller blade 10 as it passes through the slot 9. The differential pressures (pressure unevenness) present just before the air passes through the slot 9 are equalized as they pass through the slot 9 due to the directing effect created by the slot 9. However, in the case of a divided slot 9, the pressure unevenness would only be equalized within each of the slot sections $9_1 \ldots 9_n$ (chambers). Due to the differential pressure, the pressure required to create the nozzle effect may therefore be different in each of the chambers. This would create vortices CV with different values of angular momentum in the case of each chamber $9_1 \ldots 9_n$ (slot section), therefore a pressure equalizing channel 12 connecting the slot sections $9_1 \ldots 9_n$ is created in the partitions $11_1 \ldots 11_{n-1}$.

As a result, all sections $9_1 \ldots 9_n$ of the slot 9—having the same pressure—generate an adequate amount of nozzle effect, and counter-vortices CV with the same impulse torque (angular momentum) are created. These vortices CV are able to eliminate the deteriorative vortices V at the blade tip 6, since neither of them is physically divided into sections.

The pressure equalizing effect of the channels 12 positioned in the partitions $11_1 \ldots 11_{n-1}$ can also be detected when the slots 9 are uncovered, thus it can be used instead of the partial covering solution for pressure equalization at the blade tip 6 presented by this invention or as an addition thereto.

To create the slot 9, each of the slot sections $9_1 \ldots 9_n$ is milled or cut out of the originally continuous propeller blade 10 in order to ensure the continuity of the material thereof, thus increasing the strength of the propeller blade 10 and the blade tip 6.

According to another aspect of the invention, we provide a design of a propeller 100 for airplanes, helicopters, horizontal-axis wind turbines, fans and drones that is designed to rotate at a given direction of rotation R around the axis of rotation 4. The propeller 100 has at least one propeller blade which is attached to the propeller hub 20 that is in drive connection with the axis of rotation 4, and this at least one propeller blade is a propeller blade 10 designed according to the first aspect of the invention.

Preferably, the propeller 100 comprises at least two propeller blades 10 according to the first aspect of the invention attached to the propeller hub 20, and these—at least two—propeller blades 10 are integrally formed from a single piece. This is especially relevant for propeller blades designed with 3D printing technology.

Preferably, the propeller 100 comprises at least two propeller blades 10 according to the first aspect of the invention attached to the propeller hub 20, and these—at least two—propeller blades 10 and the propeller hub 20 are integrally formed from a single piece. This feature is especially relevant for propellers designed with 3D printing technology.

The solution according to the invention can be used for propeller blades 10 of any size and for propellers 100 comprising these propeller blades. The propeller blade 10 is made of wood, metal, plastic or composite material. By using the slots 9 formed in one piece or in sections with partially covered design and/or the pressure equalizing channels according to the present invention at the blade tips, the vibrations generated at the tip of the propeller blade 10 are reduced, and the lifespan of the blade is considerably increased.

The invention claimed is:

1. A propeller blade comprising:
a pressure side;
a suction side opposite to the pressure side;
a blade root that can be attached to a propeller; and
a blade tip opposite to the blade root,
wherein the pressure side is connected to the suction side with a slot that has an inlet opening on the pressure side and an outlet opening on the suction side, wherein the inlet opening has a larger surface area than the outlet opening, and
wherein the slot comprises the following pressure equalizing elements:
(a) an element that partially covers the inlet opening of the slot on the side of the slot closer to the blade tip; and
(b) the slot is divided into at least two slot sections along its length (Ls) by at least one partition and a connecting channel is positioned in at least one of the partitions to connect two adjacent slot sections.

2. The propeller blade of claim 1, wherein the propeller blade has a leading edge extending along the propeller blade's length and a trailing edge opposite to the leading edge, and a first distance (d1)—closest to the leading edge—between an edge ($DL_{min}$) of the slot closest to the blade tip and the blade tip is 9%-18.5% of the blade tip's width (Wb), and a second distance (d2)—closest to the trailing edge—between the edge of the slot ($DL_{min}$) closest to the blade tip and the blade tip is 14%-23.5% of the blade tip's width (Wb).

3. The propeller blade of claim 1, wherein the element that partially covers the inlet opening of the slot comprises a sheet on approximately 10%-50% of the width (Wsp) of the slot along the entire length (Ls) of the slot.

4. The propeller blade of claim 1 wherein the slot is covered on approximately 10%-50% of its width (Wsp) by filling in the part of the slot's inside closer to the blade tip along the entire length (Ls) of the slot.

5. A propeller designed to rotate in a defined direction of rotation around an axis of rotation, comprising at least one propeller blade according to claim 1 which is attached to a propeller hub that is in drive connection with the axis of rotation.

6. The propeller of claim 5, wherein the propeller has at least two propeller blades attached to the propeller hub, and these at least two propeller blades are integrally formed from a single piece.

7. The propeller of claim 5, wherein the propeller has at least two propeller blades attached to the propeller hub, and these at least two propeller blades and the propeller hub are integrally formed from a single piece.

8. A propeller designed to rotate in a defined direction of rotation around an axis of rotation, comprising at least one propeller blade according to claim 2 which is attached to a propeller hub that is in drive connection with the axis of rotation.

9. The propeller of claim 8, wherein the propeller has at least two propeller blades attached to the propeller hub, and these at least two propeller blades and the propeller hub are integrally formed from a single piece.

10. The propeller of claim 8, wherein the propeller has at least two propeller blades attached to the propeller hub, and these at least two propeller blades are integrally formed from a single piece.

11. A propeller blade comprising:
a pressure side;
a suction side opposite to the pressure side;
a blade root that can be attached to a propeller; and
a blade tip opposite to the blade root,
wherein the pressure side is connected to the suction side with a slot that has an inlet opening on the pressure side and an outlet opening on the suction side, wherein the inlet opening has a larger surface area than the outlet opening, and
wherein the slot comprises one of the following pressure equalizing elements:
(a) an element that partially covers the inlet opening of the slot on the side of the slot closer to the blade tip; or
(b) the slot is divided into at least two slot sections along its length (Ls) by at least one partition and a connecting channel is positioned in at least one of the partitions to connect two adjacent slot sections,
wherein the propeller blade has a leading edge extending along the propeller blade's length and a trailing edge opposite to the leading edge, and a first distance (d1)—closest to the leading edge—between an edge ($DL_{min}$) of the slot closest to the blade tip and the blade tip is 9%-18.5% of the blade tip's width (Wb), and a second distance (d2)—closest to the trailing edge—between the edge of the slot ($DL_{min}$) closest to the blade tip and the blade tip is 14%-23.5% of the blade tip's width (Wb).

12. The propeller blade of claim 11, wherein the pressure equalizing element is as described in (a), and additionally, the slot is divided into at least two slot sections along its length (Ls) by at least one partition.

13. A propeller designed to rotate in a defined direction of rotation around an axis of rotation, comprising at least one propeller blade according to claim 11 which is attached to a propeller hub that is in drive connection with the axis of rotation.

14. The propeller of claim 13, wherein the propeller has at least two propeller blades attached to the propeller hub, and these at least two propeller blades are integrally formed from a single piece.

15. The propeller of claim 13, wherein the propeller has at least two propeller blades attached to the propeller hub, and these at least two propeller blades and the propeller hub are integrally formed from a single piece.

16. The propeller blade of claim 11, wherein the element that partially covers the inlet opening of the slot comprises a sheet on approximately 10%-50% of the width (Wsp) of the slot along the entire length (Ls) of the slot.

17. The propeller blade of claim 11 wherein the slot is covered on approximately 10%-50% of its width (Wsp) by filling in the part of the slot's inside closer to the blade tip along the entire length (Ls) of the slot.

18. A propeller designed to rotate in a defined direction of rotation around an axis of rotation, comprising at least one propeller blade according to claim 12 which is attached to a propeller hub that is in drive connection with the axis of rotation.

19. The propeller of claim 18, wherein the propeller has at least two propeller blades attached to the propeller hub, and these at least two propeller blades and the propeller hub are integrally formed from a single piece.

20. The propeller of claim 18, wherein the propeller has at least two propeller blades attached to the propeller hub, and these at least two propeller blades are integrally formed from a single piece.

\* \* \* \* \*